US012488516B2

(12) United States Patent
Rovers et al.

(10) Patent No.: US 12,488,516 B2
(45) Date of Patent: Dec. 2, 2025

(54) MULTI-OUTPUT DECODER FOR TEXTURE DECOMPRESSION

(71) Applicant: Imagination Technologies Limited, Kings Langley (GB)

(72) Inventors: Kenneth Rovers, St. Albans (GB); Yoong Chert Foo, London (GB)

(73) Assignee: Imagination Technologies Limited, Kings Langley (GB)

( * ) Notice: Subject to any disclaimer, the term of this patent is extended or adjusted under 35 U.S.C. 154(b) by 59 days.

(21) Appl. No.: 18/525,715

(22) Filed: Nov. 30, 2023

(65) Prior Publication Data

US 2024/0095975 A1 Mar. 21, 2024

Related U.S. Application Data

(63) Continuation of application No. 18/101,506, filed on Jan. 25, 2023, now Pat. No. 11,836,830, which is a
(Continued)

(30) Foreign Application Priority Data

Apr. 28, 2017 (GB) ..................... 1706852

(51) Int. Cl.
*G06T 11/00* (2006.01)
*G06T 9/00* (2006.01)
(Continued)

(52) U.S. Cl.
CPC .............. *G06T 11/001* (2013.01); *G06T 9/00* (2013.01); *G06T 15/04* (2013.01); *H04N 19/436* (2014.11); *H04N 19/44* (2014.11)

(58) Field of Classification Search
CPC .................................................. G06T 11/001
See application file for complete search history.

(56) References Cited

U.S. PATENT DOCUMENTS 6,597,363 B1 * 7/2003 Duluk, Jr. ............... G06T 15/50
345/506
8,593,476 B2 * 11/2013 Demos ................... G01J 3/2823
345/589
(Continued)

FOREIGN PATENT DOCUMENTS

CN 102687175 A 9/2012
CN 105608729 A 5/2016
(Continued)

OTHER PUBLICATIONS

Nystad et al., "Adaptive Scalable Texture Compression," EGGH High Performance Graphics 2012 Proceedings of the Fourth ACM SIGGRAPH / Eurographics conference on High-Performance Graphics, Jun. 2012, pp. 105-114.
(Continued)

*Primary Examiner* — Kevin Ky
(74) *Attorney, Agent, or Firm* — Potomac Law Group, PLLC; Vincent M DeLuca

(57) ABSTRACT

A decoder decodes a plurality of texels from a received block of texture data encoded according to the Adaptive Scalable Texture Compression (ASTC) format. A parameter decode unit decodes configuration data for the received block of texture data, a colour decode unit decodes colour endpoint data for the plurality of texels in dependence on the configuration data, a weight decode unit decodes interpolation weight data for each of the plurality of texels in dependence on the configuration data, and at least one interpolator unit calculates a colour value for each of the plurality of texels using the interpolation weight data for that texel and a pair of colour endpoints from the colour endpoint data. At least one of the parameter decode unit, colour decode unit and weight decode unit decodes intermediate data from the received block that is common to the decoding
(Continued)

of a subset of texels of that block and uses that decoded data as part of the decoding of at least two of the plurality of texels.

20 Claims, 10 Drawing Sheets

Related U.S. Application Data continuation of application No. 17/161,449, filed on Jan. 28, 2021, now Pat. No. 11,568,580, which is a continuation of application No. 15/965,892, filed on Apr. 28, 2018, now Pat. No. 10,937,198.

(51) Int. Cl.
*G06T 15/04* (2011.01)
*H04N 19/436* (2014.01)
*H04N 19/44* (2014.01)

(56) References Cited

U.S. PATENT DOCUMENTS

| | | | | |
|---|---|---|---|---|
| 8,982,950 B1* | 3/2015 | Gaddy | ............ | H04N 19/30 375/240.03 |
| 2005/0169499 A1* | 8/2005 | Rodriguez | ...... | H04N 1/32144 382/100 |
| 2009/0021521 A1* | 1/2009 | Sorgard | ............ | G06T 9/00 345/582 |
| 2009/0174721 A1 | 7/2009 | Sprangle | | |
| 2012/0213435 A1* | 8/2012 | Donovan | ......... | H04N 19/186 382/166 |
| 2012/0281006 A1* | 11/2012 | Nystad | ............ | G06T 11/001 345/582 |
| 2013/0033513 A1* | 2/2013 | Rasmusson | ........ | G06T 9/00 345/552 |
| 2013/0084018 A1* | 4/2013 | Nystad | ............ | G06T 9/00 382/232 |
| 2014/0193081 A1* | 7/2014 | Nystad | ............ | G06T 7/40 382/197 |
| 2014/0210840 A1* | 7/2014 | Ellis | ............ | H04N 19/463 345/587 |
| 2016/0366449 A1* | 12/2016 | Stessen | ............ | H04N 1/64 |
| 2017/0078677 A1 | 3/2017 | Park et al. | | |
| 2017/0301112 A1* | 10/2017 | Nelam | ............ | H04N 19/42 |
| 2018/0182353 A1* | 6/2018 | Chen | ............ | G09G 5/022 |
| 2018/0247608 A1* | 8/2018 | Chen | ............ | G09G 5/04 |
| 2018/0276787 A1* | 9/2018 | Chen | ............ | G06F 12/0292 |
| 2021/0150777 A1* | 5/2021 | Rovers | ............ | H04N 19/436 |
| 2023/0169701 A1* | 6/2023 | Rovers | ............ | G06T 9/00 382/166 |
| 2023/0224456 A1* | 7/2023 | Panusopone | ......... | H04N 19/186 375/240.02 |
| 2024/0095975 A1* | 3/2024 | Rovers | ............ | H04N 19/44 |

FOREIGN PATENT DOCUMENTS

| | | |
|---|---|---|
| CN | 106056535 A | 3/2017 |
| CN | 106471545 A | 3/2017 |
| CN | 103533364 B | 4/2019 |
| EP | 3026633 A1 | 6/2016 |
| GB | 2491689 B | 8/2014 |
| WO | 2011065886 A1 | 6/2011 |

OTHER PUBLICATIONS

Wennersten et al., "Table-based Alpha Compression," Eurographics 2009; vol. 28, No. 2, pp. 687-695, 2009.
(*Note: NPL in parent apn).
Ellis et al; "ASTC Specification"; Retrieved from the Internet: URL:https://github.com/ARM-software/astc-encoder/blob/master/Documentation/ASTC%20Specification%201.0.pdf; Jul. 19, 2012; pp. 1-31.
Rovers et al; "On Improving the Performance Per Area of ASTC with a Multi-output Decoder"; 2016 IEEE 23nd Symposium On Computer Arithmetic; Jul. 24, 2017; pp. 58-59.
Rovers et al; "On Improving the Performance Per Area of ASTC with a Multi-output Decoder"; 2017 IEEE 24th Symposium On Computer Arithmetic; Jul. 25, 2017; pp. 1-27.

* cited by examiner

MULTI-OUTPUT DECODER FOR TEXTURE DECOMPRESSION

CROSS-REFERENCE TO RELATED APPLICATIONS AND CLAIM OF PRIORITY

This application is a continuation under 35 U.S.C. 120 of application Ser. No. 18/101,506 filed Jan. 25, 2023, now U.S. Pat. No. 11,836,830, which is a continuation of prior application Ser. No. 17/161,449 filed Jan. 28, 2021, now U.S. Pat. No. 11,568,580, which is a continuation of prior application Ser. No. 15/965,892 filed Apr. 28, 2018, now U.S. Pat. No. 10,937,198, which claims foreign priority under 35 U.S.C. 119 from United Kingdom Application No. 1706852.9 filed Apr. 28, 2017, the contents of which are incorporated by reference herein in their entirety.

FIELD

This invention relates to a multi-output decoder for decompressing texture data. In particular, the invention relates to a multi-output decoder for decoding texture data compressed according to an Adaptive Scalable Texture Compression (ASTC) format.

BACKGROUND

Textures are used heavily within the field of computer graphics processing. Textures may be used to represent surface properties, illumination (e.g. within the environment of a scene being imaged) or to apply surface detail to an object being rendered. Textures may require relatively large amounts of memory storage, and texture accesses can contribute a significant proportion of a graphics device's memory bandwidth. As such, it is often desirable to compress texture data.

One texture compression format is known as Adaptive Scalable Texture Compression (ASTC).

In ASTC, a compressed image, or texture, is subdivided into a plurality of data blocks, where each data block represents the texture data for a block of texels forming the texture. Each block of data has a fixed memory footprint (i.e. has a fixed size) of 128 bits. However, the data blocks are capable of representing the texture data for a varying number of texels (texture elements). The number of texels represented by a single data block may be referred to as the block footprint. The block footprint may be fixed for a given texture. The block footprint's height and width (in texels) are generally selectable from a number of predefined sizes. The footprint may be rectangular, and in some cases the block's footprint may be square. For 2-D textures, examples of block footprints include 4×4 texels; 6×6 texels; 8×8 texels and 12×12 texels (giving compression rates of 8 bits per pixel (bpp); 3.56 bpp; 2 bpp and 0.89 bpp respectively).

The colour of each texel in within a block is defined as a point on a linear gradient between a pair of colours. This pair of colours is referred to as a pair of "colour endpoints". Colours for each texel can be calculated by interpolating between a pair of colour endpoints. An interpolant weight can be used to specify a weighted average of the two colour endpoints (i.e. the position on the linear gradient between those colour endpoints) to thereby define the colour for that texel. This process is illustrated schematically in FIG. 1A, which shows a pair of colour endpoints A (denoted 104) and B (denoted 106) in a red-green (RB) colour space denoted 102. In this example, each texel can have one of five weights: 0/4 (corresponding to colour A); 1/4; 2/4; 3/4; or 4/4 (corresponding to colour B). An example of the texel weights for each texel of a 4 by 4 block is shown in FIG. 1B. Though shown for the simple example of an RB colour space, the same approach is applied when working in different colour spaces such as RGB or RGBA.

Each colour endpoint may be composed of one or more colour values. A colour endpoint may be composed of up to a maximum of four colour values. When decoding a texel, colour values are decoded from the data block and those values are then converted into colour endpoints. The way colour values are converted into colour endpoints is defined by a parameter known as the colour endpoint mode. Information on the colour endpoint mode for a texel is encoded within the data block. The ASTC specification defines 16 possible colour endpoint modes, which vary from computing a colour endpoint from a single colour value up to computing a colour endpoint from four colour values.

The interpolant weights may be stored in the form of a weight grid, which is a 2-D grid of weight values corresponding to the block of texels represented in the data block. In certain encodings, an interpolant weight may be stored for each texel in the data block (i.e. the dimensions of the weight grid correspond to the dimensions of the block footprint). However, for data blocks that represent texture data for a larger number of texels (e.g. 12×12 texels), there may not be enough data within the block to store an interpolant weight for each texel. In this case, a sparser weight grid may be stored that contains fewer weights than the number of texels within each data block. A weight for each texel in the data block can then be calculated from an interpolation of this sparser weight grid.

In order to do this, the coordinates of a texel within the block are first scaled to the dimensions of the weight grid. The coordinates are scaled by a scale factor that scales the dimensions of the weight grid to the dimensions of the block footprint. The re-scaled position of the texel with respect to the weight grid is then used to select a subset of weights of the weight grid and to interpolate those to calculate a weight for the texel. For example, four weights from the weight grid may be selected and interpolated to calculate the weight for a texel.

In certain cases, a single pair of colour endpoints can be used to calculate the colour for each texel within a data block. However, in other cases, a block may represent texels which have a mixture of different colours that cannot reasonably be represented by interpolating between a single pair of colour endpoints. To get around this problem, each texel in the data block can be assigned to one of up to four partitions, where each partition is associated with its own colour endpoint pair. To determine the colour of a texel within the block, the partition that the texel belongs to is determined and the colour calculated from the interpolant weight for that texel and the colour end point pairs associated with the partition. The interpolant weight can be stored and encoded within the data block independently of the colour end point pair (i.e. independently of the partition to which the texel belongs).

This is illustrated schematically in FIGS. 2A and 2B. FIG. 2A shows a first colour endpoint pair 202 formed of endpoint colours A and B, and a second colour endpoint pair 204 formed of endpoint colours C and D within an RB colour space 206. The first endpoint pair belongs to a first partition and the second endpoint pair belongs to a second partition. Thus in this example there are two partitions. Each colour endpoint pair can be interpolated between with five weights. FIG. 2B shows a block of texels 208 represented by a block of texture data. A partitioning mask is shown overlaid on the block of texels indicating which partition each texel belongs to. The partitioning mask is a grid of values, where each value indicates which partition a texel belongs to. Each value may as such be referred to as a partition index. In particular, a value of 1 indicates a texel belongs to the first partition (associated with colour endpoint pair 202); and a value of 2 indicates a texel belongs to the second partition (associated with colour endpoint pair 204). The weights for each texel are also shown. To determine the colour for a texel, the partition index is used to identify the colour endpoint pair, and the weight is used to interpolate between that pair. For example, texel 210 has a partition index of 1, and a weight of 3/4 and thus has a colour defined by the position 212 in RB colour space. Texel 214 has a partition index of 2 and a weight of 1/4 and so has a colour defined by the position 216 in RB colour space.

Whilst ASTC can provide an effective way of compressing texture data, the decoding of texture data that is compressed in accordance with ASTC can suffer from certain drawbacks.

Texture data compressed in accordance with the ASTC format can be decoded, or decompressed, by an ASTC decoder. Typically, these decoders operate to decode a single texel from a block of data (where that data block contains data for at least a 4×4 block of texels). This means that if it is desired to decode more than one texel from the block at the same time (for example to use the decoded texels in a filtering operation), multiple decoders are needed to decode the block of data in parallel. This may costly in terms of hardware resources and silicon area.

SUMMARY OF INVENTION

According to the present invention there is provided a decoder configured to decode a plurality of texels from a received block of texture data encoded according to the Adaptive Scalable Texture Compression (ASTC) format, the decoder comprising: a parameter decode unit configured to decode configuration data for the received block of texture data; a colour decode unit configured to decode colour endpoint data for the plurality of texels of the received block in dependence on the configuration data; a weight decode unit configured to decode interpolation weight data for each of the plurality of texels of the received block in dependence on the configuration data; and at least one interpolator unit configured to calculate a colour value for each of the plurality of texels of the received block using the interpolation weight data for that texel and a pair of colour endpoints from the colour endpoint data; wherein at least one of the parameter decode unit, colour decode unit and weight decode unit are configured to decode intermediate data from the received block that is common to the decoding of the texels from that block and to use that common decoded intermediate data as part of the decoding of at least two of the plurality of texels from the received block of texture data.

The at least one of the parameter decode unit, colour decode unit and weight decode unit may be configured to use the same data as part of the decoding of each of the plurality of texels.

A first portion of the configuration data may be common to the decoding of the plurality of texels from the received block, and the weight decode unit may be configured to use that first portion of configuration data for decoding the interpolation weight data for each of the plurality of texels.

The first portion of configuration data may comprise at least one of: a weight grid size specifying the dimensions of a weight grid; and weight ranges specifying the range of values occupied by weights of the grid.

A second portion of the configuration data may be common to the decoding of the plurality of texels from the received block, and the colour decode unit may be configured to use that second portion of configuration data for decoding the colour endpoint data for each of the plurality of texels.

The second portion of configuration data may comprise colour endpoint mode data that specifies how to convert a set of colour endpoint values into a pair of colour endpoints.

The parameter decode unit may be configured to: decode intermediate configuration data from the block as part of decoding the configuration data; and use that same intermediate configuration data to decode a partition index for each of the plurality of texels.

The intermediate configuration data may comprise at least one of: a partition pattern index; and a partition number.

The colour decode unit may be configured to: decode intermediate colour data from the block as part of decoding the colour endpoint data that is independent of the texels being decoded from that block; and use that intermediate colour data to decode the colour endpoint data for each of the plurality of texels.

The intermediate colour data may comprise the size of the data within the block used to represent the colour endpoints.

The intermediate colour data may further comprise colour endpoint mode data that specifies how to convert a set of colour endpoint values into a pair of colour endpoints.

The colour decode unit may be configured to decode a set of colour values and to convert those values into a pair of colour endpoints for each of the plurality of texels, the colour decode unit may also be configured to use at least one of the colour endpoints for two or more of the plurality of texels.

The texels represented by the block may be partitioned into $n_p$ partitions, and the colour decode unit may be configured to decode a set of $n_v$ colour values and to convert those values into a pair of colour endpoints for each of the plurality of texels, each colour endpoint being formed from $n_{cv}$ colour values, where $n_v < 2n_p n_{cv}$.

In some examples, $n_p=4$, $n_{cv}=4$ and $n_v=18$.

The weight decode unit may be configured to: decode intermediate weight data from the block as part of decoding the interpolation weight data that is common to the decoding of the texels from the received block; and use that data to decode the interpolation weight data for each of the plurality of texels.

The block of texture data may represent a block of n by m texels, and the intermediate weight data may comprise a scaling factor for scaling a weight grid to the block of n by m texels represented by the block of texture data.

The intermediate data may comprise the size of the data within the block used to represent the interpolation weight data.

The texels represented by the block may be partitioned into $n_p$ partitions, and the decoder may comprise $n_p$ interpolators each configured to calculate a colour value for a subset of texels in a respective partition using the interpolation weight data for that texel and a respective pair of colour endpoints from the colour endpoint data.

The block of texture data may represent a block of n by m texels, and the decoder may be configured to decode a block of p by q texels, where $p \leq n$ and $q \leq m$.

The decoder may be configured to decode a block of 2 by 2 texels.

According to a second aspect of the present disclosure there is provided a method of decoding a plurality of texels from a received block of texture data encoded according to the Adaptive Scalable Texture Compression (ASTC) format, the method comprising:

decoding configuration data for the received block of texture data;

decoding colour endpoint data for the plurality of texels of the received block in dependence on the configuration data;

decoding interpolation weight data for each of the plurality of texels of the received block in dependence on the configuration data; and calculating a colour value for each of the plurality of texels of the received block using the interpolation weight data for that texel and a pair of colour endpoints from the colour endpoint data;

wherein at least one of the decoding of configuration data, decoding of colour endpoint data and decoding of interpolation weight data comprises decoding intermediate data from the received block that is common to the decoding of the texels from that block and using that same decoded intermediate data for the decoding of at least two of the plurality of texels from the received block of texture data.

At least one of the decoding of configuration data, decoding of colour endpoint data and decoding of interpolation weight data may comprise decoding intermediate data from the block that is common to the decoding of the texels from that block and using that same data for the decoding each of the plurality of texels.

A first portion of the configuration data may be common to the decoding of the plurality of texels from the received block, and the step of decoding interpolation weight data may comprise using that first portion of configuration data for decoding the interpolation weight data for each of the plurality of texels.

The first portion of configuration data may comprise at least one of: a weight grid size specifying the dimensions of a weight grid; and weight ranges specifying the range of values occupied by weights of the grid.

A second portion of the configuration data may be common to the decoding of the plurality of texels from the received block, and the step of decoding colour endpoint data may comprise using that second portion of configuration data for decoding the colour endpoint data for each of the plurality of texels.

The second portion of configuration data may comprise colour endpoint mode data that specifies how to convert a set of colour endpoint values into a pair of colour endpoints.

The step of decoding configuration data may comprise decoding intermediate configuration data from the block and using that same intermediate configuration data to decode a partition index for each of the plurality of texels.

The intermediate configuration data may comprise at least one of: a partition pattern index; and a partition number.

The step of decoding colour endpoint data may comprise: decoding intermediate colour data from the block that is independent of the texels being decoded from that block; and using that intermediate colour data to decode the colour endpoint data for each of the plurality of texels.

The intermediate colour data may comprise the size of the data within the block used to represent the colour endpoints.

The intermediate colour data may further comprise colour endpoint mode data that specifies how to convert a set of colour endpoint values into a pair of colour endpoints.

The step of decoding colour endpoint data may comprise decoding a set of colour values and converting those values into a pair of colour endpoints for each of the plurality of texels, wherein at least one of the colour endpoints may be used for two or more of the plurality of texels.

The texels represented by the block may be partitioned into $n_p$ partitions, and the step of decoding the colour endpoint data may comprise decoding a set of $n_v$ colour values and converting those values into a pair of colour endpoints for each of the plurality of texels, each colour endpoint being formed from $n_{cv}$ colour values, where $n_v < 2 n_p n_{cv}$.

In some examples, $n_p = 4$, $n_{cv} = 4$ and $n_v = 18$.

The step of decoding interpolation weight data may comprise: decoding intermediate weight data from the block that is independent of the texels being decoded from that block; and using that data to decode the interpolation weight data for each of the plurality of texels.

The block of texture data may represent a block of n by m texels, and the intermediate weight data may comprise a scaling factor for scaling a weight grid to the block of n by m texels represented by the block of texture data.

The intermediate data may comprise the size of the data within the block used to represent the interpolation weight data.

The block of texture data may represent a block of n by m texels, and the method may comprise decoding a block of p by q texels, where p≤n and q≤m.

The method may comprise decoding a block of 2 by 2 texels.

There may be provided a decoder configured to perform any of the methods described herein.

The decoder may be embodied in hardware on an integrated circuit.

There may be provided a method of manufacturing decoder as described in any of the examples herein.

There may be provided computer readable code configured to cause any of the methods described herein to be performed when the code is run.

There may be provided a computer readable storage medium having encoded thereon the computer readable code above.

There may be provided an integrated circuit definition dataset that, when processed in an integrated circuit manufacturing system, configures the integrated circuit manufacturing system to manufacture a decoder as described in any of the examples herein.

There may be provided a non-transitory computer readable storage medium having stored thereon a computer readable description of an integrated circuit that, when processed in an integrated circuit manufacturing system, causes the integrated circuit manufacturing system to manufacture a decoder as described in any of the examples herein.

There may be provided an integrated circuit manufacturing system configured to manufacture a decoder as described in any of the examples herein.

There may be provided an integrated circuit manufacturing system comprising:

a non-transitory computer readable storage medium having stored thereon a computer readable description of an integrated circuit that describes a decoder;

a layout processing system configured to process the integrated circuit description so as to generate a circuit layout description of an integrated circuit embodying the decoder; and an integrated circuit generation system configured to manufacture decoder according to the circuit layout description, wherein decoder comprises:
a parameter decode unit configured to decode configuration data for the block of texture data;
a colour decode unit configured to decode colour endpoint data for the plurality of texels of the block in dependence on the configuration data;
a weight decode unit configured to decode interpolation weight data for each of the plurality of texels in dependence on the configuration data; and
at least one interpolator unit configured to calculate a colour value for each of the plurality of texels using the interpolation weight data for that texel and a pair of colour endpoints from the colour endpoint data;
wherein at least one of the parameter decode unit, colour decode unit and weight decode unit are configured to decode data from the block that is independent of the texels being decoded from that block and to use that same data as part of the decoding of at least two of the plurality of texels.

BRIEF DESCRIPTION OF DRAWINGS

The present disclosure will now be described by way of example with reference to the accompanying drawings. In the drawings.

DETAILED DESCRIPTION

Figures 1A, 1B:
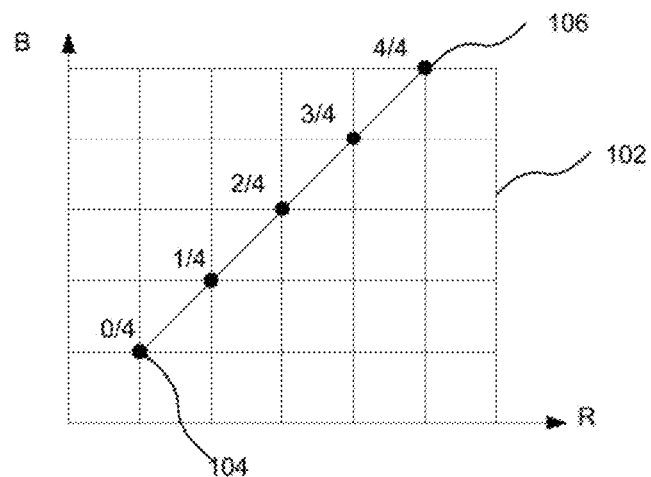
FIG. 1A shows a colour endpoint pair located within an RB colour space.
FIG. 1B shows a 4 by 4 block of texels and a grid of weights indicating the weight for each texel used to interpolate between a colour endpoint pair.
Figure 2A:
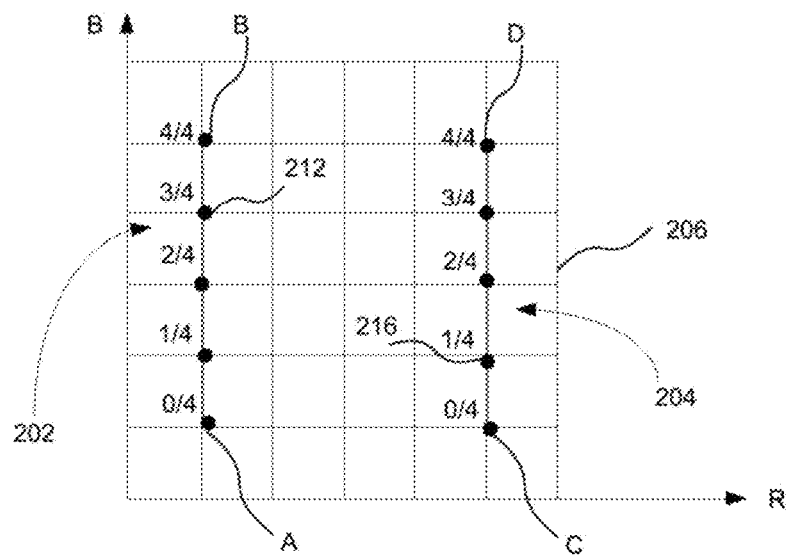
FIG. 2A shows two colour endpoint pairs located within an RB colour space.
Figure 2B:
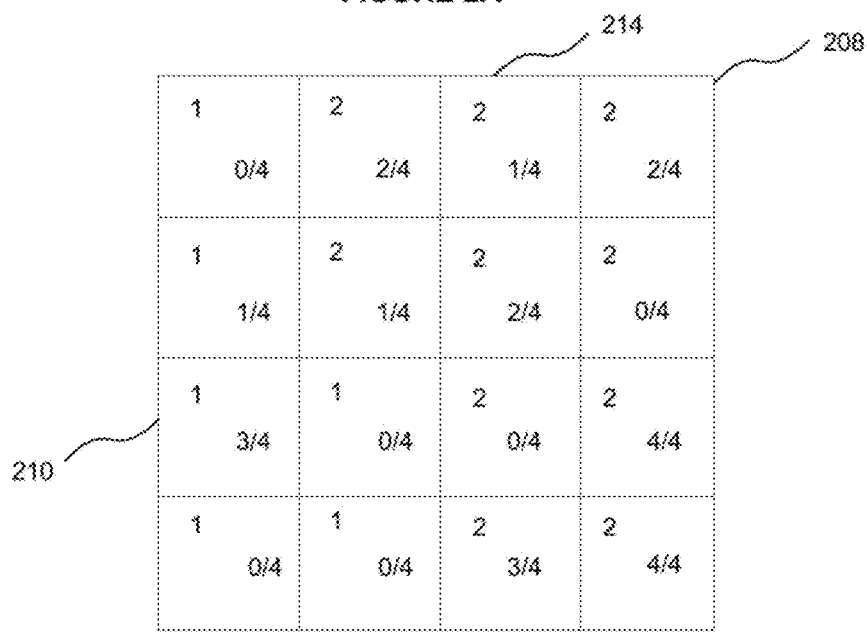
FIG. 2B shows a 4 by 4 block of texels with a partition mask indicating the partition index of each texel and a weight grid indicating the weight for each texel.

The present disclosure is directed to a multi-output decoder that is capable of decoding multiple texels from a block of texture data compressed according to the Adaptive Scalable Texture Compression (ASTC) format. The block of texture data may represent, or encode, an n by m block of texels. The size of the n by m texel block (as governed by the values of n and m) may be referred to as the block's footprint, and is selectable from a number of predefined sizes specified by the ASTC standard. The size of the texture data block (referred to as its memory footprint) is fixed at 128 bits. The multi-output decoder is capable of decoding a number of texels $n_t$ in the range $2 \leq n_t \leq nm$ from a single received data block. For example, the multi-output decoder may decode a block of p by q texels from the texture data block, where $p \leq n$ and $q \leq m$.

In order to decode texels from the texture data block, intermediate data is decoded from the received data block that is used during the decoding process in order to decode the final texel colour values. The intermediate data is data decoded from the block that is used during part of the decoding process, but may not itself represent a final decoded texel colour. Part of this intermediate data is common to the decoding of at least a subset (i.e. one or more texels) of the plurality of texels being decoded from the received data block. Part of this intermediate data may be independent of the texels being decoded from the block—that is, part of the intermediate data for a given data block is the same regardless of how many, or which, texels from that block are being decoded. In other words, a part of the intermediate data is common to the decoding of each texel from the texture data block. This data is data that is specified per block.

Examples of this common intermediate data will be explained in more detail below, but include for example the number of partitions of the data, the number of texture planes and the range of weight values. It has been appreciated that for a multi-output decoder, some or all of this common decoded intermediate data may be used for the decoding of at least two of the plurality of texels being decoded from the data block. In some cases, a portion or all of the common intermediate data may used for the decoding of each of the plurality of texels. That is, rather than decode this intermediate data for each of the texels being decoded from the block, the intermediate data can in some cases be decoded only once and that same data then used as part of the decoding of each of the plurality of texels from the texture data block. Thus, the same instance of per-block data may be used as part of the decoding of each of the plurality of texels from the texture data block, This allows the same hardware in the decoder to be used as part of the decoding of each of the multiple texels. This in turn means the multi-output decoder can operate to decode multiple texels from the block in parallel without commensurate increases in the size of the decoding hardware compared to operating a plurality of conventional ASTC decoders in parallel which each only decode only a single texel from a block of texture data.

Figure 3:
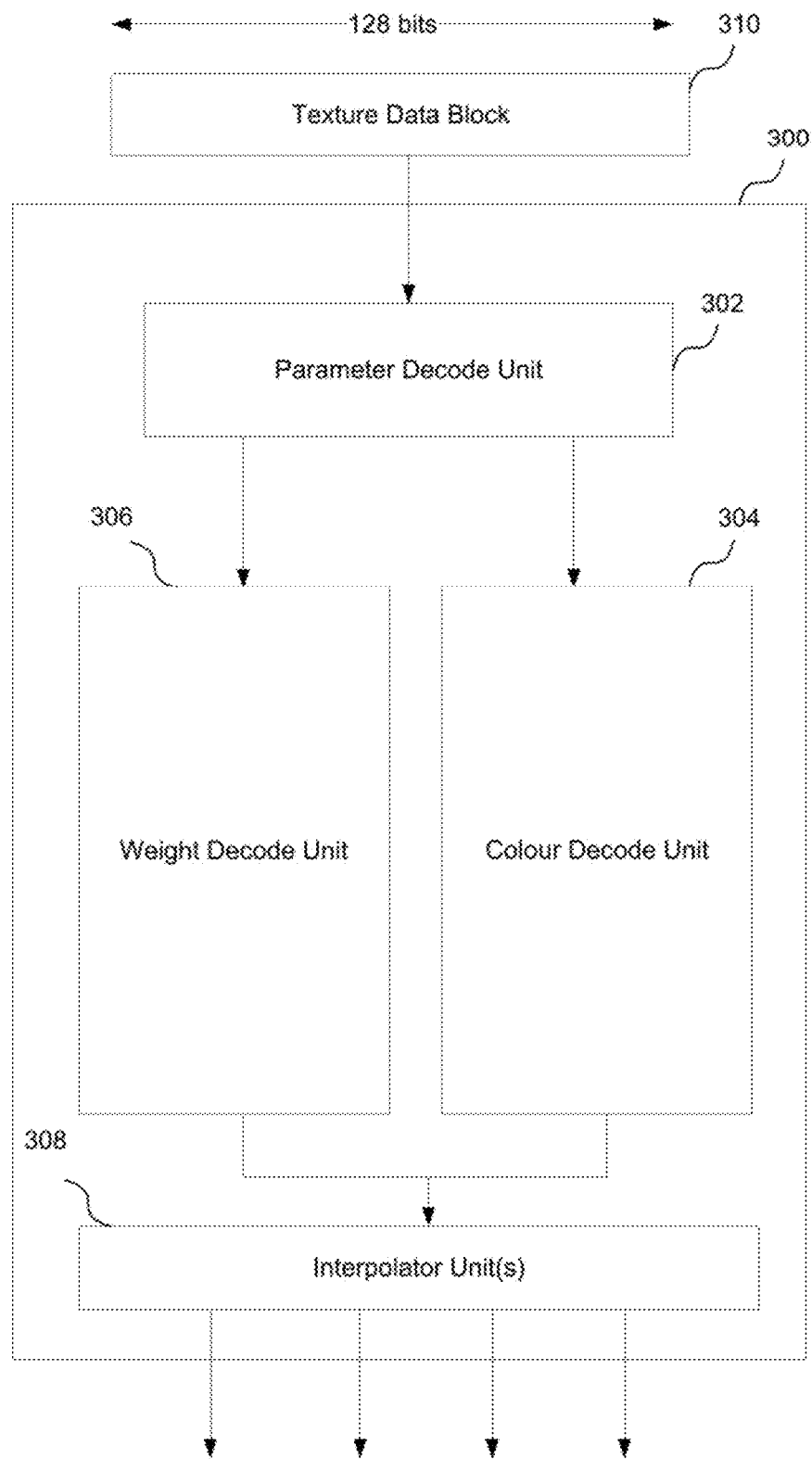
FIG. 3 shows a multi-output decoder for decoding a plurality of texels from a block of data compressed according to the ASTC specification.

FIG. 3 shows a schematic illustration of a multi-output decoder 300 for decoding a plurality of texels from a block of texture data encoded according to an ASTC format.

The decoder comprises a parameter decode unit 302, a colour decode unit 304, a weight decode unit 306 and at least one interpolator unit 308. The parameter decode unit is coupled to the colour decode unit and the weight decode unit. In particular, an output of the parameter decode unit is coupled to an input of both the weight decode unit and colour decode unit. Each of the colour decode unit and the weight decode unit are coupled to the at least one interpolator unit. More specifically, an output of the weight and colour decode units is coupled to an input of the interpolator unit(s).

The decoder 300 is configured to receive as an input a block of ASTC-encoded texture data, shown at 310. As mentioned above, the block has a size, or memory footprint, of 128 bits. The texture data block 310 encodes texel colours for an n by m block of texels. That n by m block of texels may form part of a compressed image, or texture. The texture may be composed of a plurality of such texture blocks, with each of those blocks being encoded in a respective 128-bit data block. The number of texels represented by block of texture data is referred to as the block footprint. The dimensions of the block (i.e. the values of n and m) are selectable from a number of fixed alternatives specified by the ASTC standard.

The decoder is capable of decoding a plurality of texels from the texture block 310. The maximum number of texels capable of being decoded from the single received block 110 is denoted $n_t$. The decoder may decode a plurality of texels in parallel. The decoder may for instance comprise a plurality of outputs for outputting a respective decoded texel. The decoder may operate to decode the plurality of texels according to a decoding process. That decoding process may comprise a series of decoding steps, or operations. The series of steps undergone to decode a particular texel may be referred to as a decoding pipeline. Thus, the decoder 300 may operate to decode a plurality of texels from block 310, where each texel is decoded according to decoding pipeline. As will be appreciated from the following, the decoder 300 may be configured to, or be capable of, decoding any number of texels from the block 310. That is, $2 \leq n_t \leq nm$. The value of $n_t$ may vary by implementation. The decoder may decode a contiguous p by q block of texels from the block of data 310, where $p \leq n$ and $q \leq m$.

Figure 4:
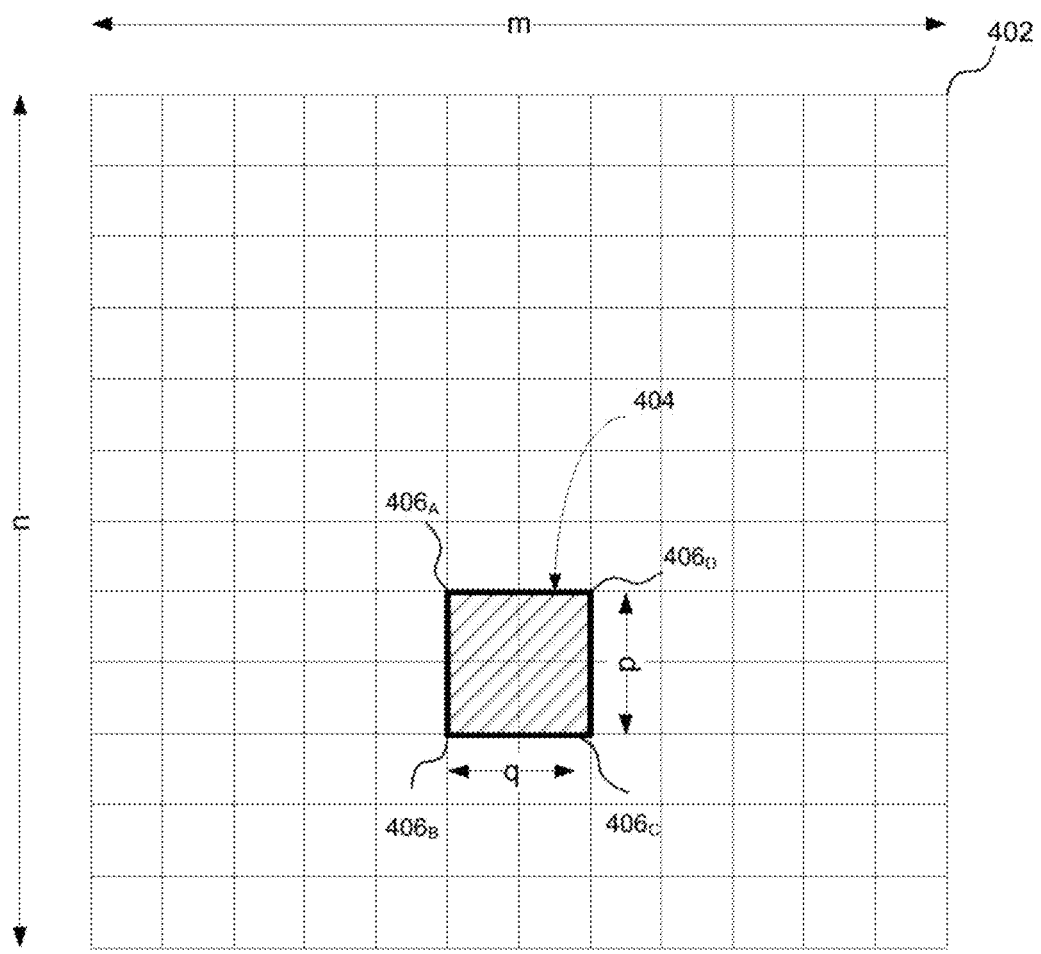
FIG. 4 shows the block footprint for a block of texture data and a sub-block of texels to be decoded from that block.

In the following example, for the purposes of illustration the block of texture data 310 represents a 12 by 12 block of texels, and the decoder operates to decode $n_t$ texels from the data block 310, with the $n_t$ texels are arranged as a 2 by 2 sub-block of texels. Though just an example, decoding a 2 by 2 sub-block of texels from the data block 310 may be particularly useful due to the use of 2 by 2 texel blocks in a variety of filtering operations including, for example, bilinear filtering, tri-linear filtering and anisotropic filtering. The blocks of textures are illustrated schematically in FIG. 4. Here, the block footprint of the data block 310 is illustrated at 402, which is the n by m block of texels represented by the block of data 110. The p by q sub-block of texels to be decoded by the decoder 300 is shown at 404, and is formed of texels $406_{A,B,C,D}$. The texture data represented by the data block may be partitioned into a plurality of partitions.

The parameter decode unit 302 receives the data block 310. The parameter decode unit operates to decode configuration data for the block 310. The configuration data may be data that specifies parameters of the texture data and its encoding within the block 310. The configuration data could include, for example: the size of the weight grid and/or the range of the weight values; an indication of whether the texture data is single plane or dual plane; the partition count (i.e. the number of partitions for the data block 310) and the colour endpoint modes.

The colour decode unit 304 decodes colour endpoint data for each of the $n_t$ texels being decoded from the block 310 using the configuration data decoded from the data block 310. The colour endpoint data includes a pair of colour endpoints for each of the texels being decoded. If the block of data has a partition count of one, then each of the texels being decoded is associated with the same colour endpoint pair. The colour endpoint data may include up to eight colour endpoints forming four colour endpoint pairs (for a partition count of four—i.e. one colour endpoint pair per partition). One or more of the colour endpoints may be associated with multiple texels of the group of texels being decoded from the data block 310; i.e. some of the texels being decoded may share a common colour endpoint, or common colour endpoint pair. For example, if more than four texels are being decoded in parallel from the data block 310, at least two of those texels will share a common colour endpoint or colour endpoint pair because the ASTC standard limits the number of partitions to a maximum of four (and thus the number of colour endpoint pairs is limited to a maximum of four).

The weight decode unit 306 decodes interpolation weight data for each of the $n_t$ texels being decoded from the block 310 using the configuration data decoded by the parameter decode unit 302. The interpolation weight data for a given texel could be a single weight (e.g. if the texture data in the block is single plane) or a pair of weights (e.g. if the texture data in the block is dual-plane). Thus the weight decode unit may decode a weight for each texel being decoded from the block 310, or a pair of weights for each texel being decoded from the block 310. These weight values are received by the interpolation unit(s) 308.

The interpolation unit(s) 308 calculate a colour value for each of the texels $n_t$ being decoded using the colour endpoint data for each texel and the weight value for each texel.

The decoder 300 may then output the decoded colour values for each of the $n_t$ texels. That is, the decoder may output $n_t$ texel colour values. These may be outputted in parallel.

Figure 5:
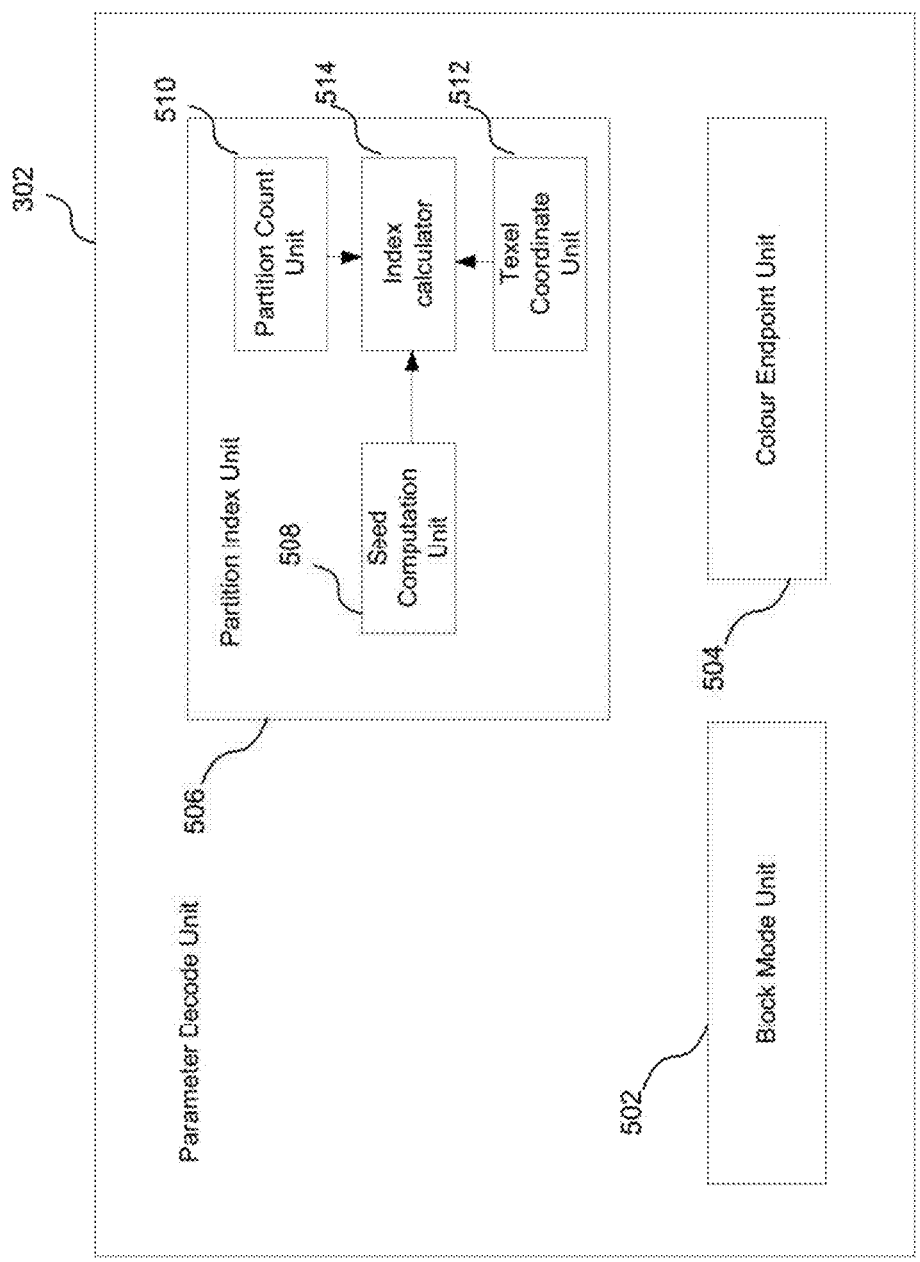
FIG. 5 shows an example structure of a parameter decode unit forming part of the decoder shown in FIG. 3.

An example of the parameter decode unit 302 is shown in more detail in FIG. 5. As shown, the parameter decode unit 302 comprises a block mode unit 502; a colour endpoint unit 504 and a partition index unit 506.

The block mode unit 502 is configured to decode a portion of the configuration data including the weight grid size (its height and width, i.e. its dimensions) and the range of weight values that can be occupied by the weights of the weight grid.

The partition index unit 506 is configured to calculate a partition index for each of the texels to be decoded from the block 110 (in this example, texels $406_{A-D}$). The partition index identifies which partition each texel belongs to, and is an example of a configuration parameter.

The partition index for each texel is computed from a seed, the partition count and the coordinate of the texel within the block 502. The seed, partition count and texel coordinates may be referred to as intermediate configuration data since they are examples of data that are used in order to decode a configuration parameter (the partition index), but are themselves not configuration parameters. The partition count is decoded from the data block 310 by a partition count unit 510 that forms part of the partition index unit 506. The seed is computed by a seed computation block 508 from a partition pattern index decoded from the data block 310. The coordinates of the texels are computed by a texel coordinate unit (TCU) 512. The TCU 212 may comprise hardware for calculating the coordinates of each of the texels 506A_D in parallel. The partition index unit comprises an index calculator 514 for calculating the partition index from the seed, partition count and texel coordinates. The index calculator calculates a partition index for each of the texels $406_{A-D}$ being decoded.

The colour endpoint unit 504 is configured to decode the colour endpoint modes from the data block 310. In the case that the texture data has a partition count greater than one (i.e. there are multiple partitions), the colour endpoint unit may decode the colour endpoint mode for each partition. As described above, the colour endpoint modes specify how colour values decoded from the block 310 are to be converted into colour endpoints. In general, the ASTC specification specifies 16 possible colour endpoint modes, where the modes require differing numbers of colour values to form a colour endpoint. In particular, four of the modes form a single colour endpoint from a single colour value (e.g. luminance), and thus require two colour values for each colour endpoint pair; four of the modes form a single colour endpoint from two colour values, and thus require four colour values for each colour endpoint pair; four of the modes require three colour values to form each colour endpoint, and thus require 6 colour values for each colour endpoint pair; and four of the modes require four colour values to form a single colour endpoint (e.g. RGBα), and thus require 8 colour values for each colour endpoint pair.

A portion of the configuration data decoded and/or calculated by the parameter decode unit 302 is independent of the texels being decoded from the data block 310. That is, a portion of the configuration data for the block 310 is the same regardless of the texels being decoded from that block. The portion of configuration data is therefore common to the decoding of each of the plurality of texels being decoded from the texture data block. This data can be said to be specified per data block, rather than per texel. In some cases, this portion of 'per-data-block' configuration data may form a substantial portion of the configuration data.

Conveniently, this per-block configuration data decoded by the parameter decode unit may be used by the colour decode unit 504 and weight decode unit 506 as part of the decoding process for each of the texels $406_{A-D}$ (i.e. for each of the $n_t$ texels being decoded). A first subset, or portion of the per-block configuration data may be used by the colour decode unit and a second subset, or portion, of the per-block configuration data may be used by the weight decode unit. That is, the colour decode unit may use a first portion of the per-block configuration data to decode the endpoint data for all the texels $406_{A-D}$; and the weight decode unit may use a second portion of the per-block configuration data to decode the interpolation weight data for all the texels $406_{A-D}$. This means that the parameter decode unit need not decode the per-block configuration data $n_t$ times when the decoder 300 is to decode $n_t$ texels from the block in parallel. Instead, the parameter decode unit 302 only decodes the per-block configuration data once when the decoder 302 decodes $n_t$ texels in parallel from the block 110. This in turn means the parameter decode unit 302 does not need hardware to decode the per-block configuration data $n_t$ times in parallel, leading to potential hardware savings.

In this particular example, the weight grid size and the range of weight values are examples of configuration data that are independent of the texels being decoded from the block 310, and thus these same configuration parameters are used in the decoding of each of the texels $406_{A-D}$. Thus the block mode unit 502 is formed of substantially the same hardware as if the decoder 300 were only a single-output decoder. Put another way, the block mode unit 502 can be shared across, or used as part of, the decoding pipelines for each of the texels to be decoded from the block 310.

The colour endpoint mode data decoded by the colour endpoint unit 504 is also independent of the texels being decoded from the block 310. Thus the same colour endpoint mode data decoded by this unit is used in the decoding of each of the texels $406_{A-D}$. In other words, this data is shared across the decoding pipelines for each of the texels being decoded.

With respect to the partition index unit 506, both the partition count and the seed (generated from the partition pattern index decoded from the data block 310) are per-block parameters independent of the texels being decoded.

Thus the same seed and decoded partition count can be used in the calculation of the partition index for each of the texels $406_{A-D}$, and so the seed computation unit 508 and the partition count unit 510 can be shared across the decoding pipelines for each of these texels being decoded.

The hardware resources of the parameter decode unit 302 can therefore be reduced compared to a multi-decoder formed from a plurality of conventional ASTC decoders operating in parallel.

Figure 6:
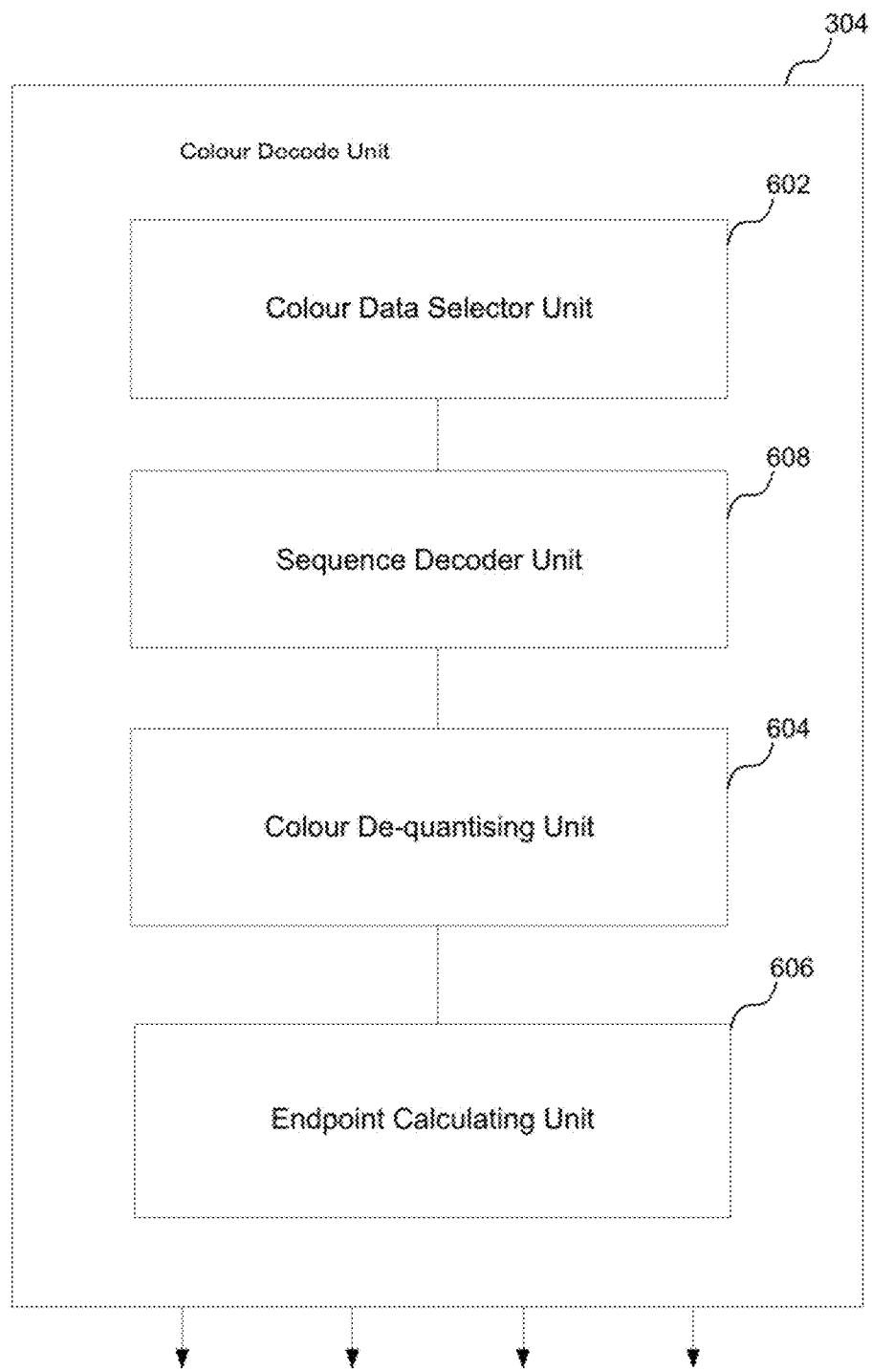
FIG. 6 shows an example structure of a colour decode unit forming part of the decoder shown in FIG. 3.

An example structure of the colour decode unit 304 is shown in FIG. 6. The colour decode unit comprises a colour data selector unit (CDSU) 602, a sequence decoder unit 608, a colour de-quantising unit 604 and a colour endpoint calculation unit 606.

The CDSU 602 is configured to determine the size of the colour data within the data block 310, i.e. the size of the data within the block used to represent the colour endpoints). In ASTC, the colour data is encoded within a data block as a variable length bit string. The colour data is encoded according to a bounded integer sequence encoding (BISE) scheme. The size of the colour data can be determined from the partition count (decoded by the partition count unit 510) and the block mode data decoded by the block mode unit 502. Thus, the CDSU 602 determines the size of the colour data using only a portion of the configuration data that is independent of the texels being decoded from the block 310. The CDSU 602 may also decode the location of the colour data within the data block. This information may again be determined from the partition count and the block mode data.

As described above, the partition count and the block mode data are parameters specified per-block of data and are independent of the texels being decoded from the block 310. Thus the colour decode unit 304 can use that portion of configuration data as part of the decoding for each of the texels $406_{A-D}$. In particular, the CDSU 602 can perform a single determination of the colour data size within the block 310 and that determination can then be used as part of the decoding pipeline for each of the texels $406_{A-D}$.

The sequence decoder unit 608 is configured to perform integer sequence decoding of the colour data. As mentioned above, the colour data is encoded within a data block according to a binary integer sequence encoding (BISE) scheme. The use of the BISE scheme enables colour values to be encoded in a fractional number of bits. A sequence of values can be represented using trits (base-3 representation) or quints (base-5 representation). Other base representations may also be used.

The colour de-quantising unit 604 is configured to extract the colour values from the decoded colour data and to de-quantise those colour values. De-quantising means restoring the encoded colour values to their original range (e.g. [0, 1, . . . 255]). In certain cases, each of the texels $406_{A-D}$ being decoded in parallel by the decoder 300 could be in a different partition, in which case eight colour end points may be needed (two colour end points per partition). If each of these partitions were also associated with a colour endpoint mode in which each colour endpoint was formed from four colour values, this would require 32 colour values to be extracted and dequantised from the data block 310. However, the ASTC specification limits the number of colour values that may be encoded within a 128-bit data block to 18.

In order for the multi-decoder to be able to best accommodate the above situation, the colour de-quantising unit 604 may be configured to (or have the appropriate hardware to be able to) extract and de-quantise 18 colour values from the data block 310 in parallel. It will be noted that because it is not possible to decode 32 colour values from the data block 310, certain colour endpoint modes for partitioned data (e.g. data with a partition count of 3 or 4) are not possible.

The endpoint calculation unit 606 is configured to convert the de-quantised colour values decoded by the de-quantising unit 604 into a set of colour endpoints. The endpoint calculation unit 606 may calculate the set of colour endpoints using the partition index and associated colour endpoint mode for each of the texels 406$_{A-D}$ to be decoded. If more than four texels are to be decoded (for example, if 10 texels are to be decoded), then there will be a redundancy in partition indices and associated colour endpoint modes for those texels (because a block of data can only have a maximum of four partitions). Thus to reduce the amount of computations, the endpoint calculation unit may convert the colour values into the set of colour endpoints using the set of partition indices (and associated colour endpoint modes) spanned by the texels to be decoded. The de-quantising unit 604 may receive this information from the partition index unit 506 and the colour endpoint unit 504.

The endpoint calculation unit may output a pair of colour endpoints for each texel being decoded from the block 310. To do this, the endpoint calculation unit 606 may select an endpoint pair from the set of colour endpoints using the partition index for each texel being decoded. Alternatively, it may output the colour endpoints for each partition and a partition index for each texel.

Like the parameter decode unit 302, the colour decode unit 304 is configured to decode data from the block 310 that is independent of the texels being decoded. That is, the colour decode unit 304 is configured to decode per-block data as part of decoding the colour endpoint data for the texels 406$_{A-D}$. The colour decode unit 304 uses that same data to decode the colour endpoint data for all of the texels 406$_{A-D}$ being decoded. That is, the same per-block data decoded by the colour decode unit 304 is used in the decoding pipeline of each of the texels 406$_{A-D}$.

For instance, the size and location of the colour data within the data block 310 as decoded by the CDSU 602 is a parameter specified on a per-block level and is independent of which texels are being decoded from the data block. This data may be referred to as intermediate colour data, since it is data decoded from that block that is used to decode the colour endpoint data output from the colour decode unit. Because this intermediate data is independent of the texels being decoded, it is used by the remainder of the colour decode unit 304 when decoding the endpoint data for each of the texels 406$_{A-D}$ being decoded from the block 310. That is, the intermediate colour data is common to the decoding of each texel from the data block 310. By only calculating this intermediate colour data once and re-using it as part of the decoding pipeline for each of the texels being decoded, the hardware requirements of the CDSU 602 can be made substantially the same as for a single-output ASTC decoder.

The colour values decoded by sequence decoder unit 608 and dequantized by the colour de-quantising unit 604 may be partially shared across the decoding pipelines of the texels 406$_{A-D}$. For example, ASTC limits the number of colour values that may be stored within the data block 310 to 18. When decoding a single texel from the block 310, up to eight colour values are needed (up to four colour values per colour endpoint, for two colour endpoints forming a single colour endpoint pair). Thus, when decoding a single texel, eight colour values may be BISE decoded and dequantized. When the decoder is decoding more than (18/8) texels in parallel (i.e., when the decoder decodes three or more texels in parallel), all 18 colour values may be BISE decoded and de-quantised. However, because the number of colour values being BISE decoded and dequantized is less than the multiple of the number of texels being decoded in parallel and the number of colour values needed per texel, the BISE decoded and dequantized colour values are partially shared across the decoding pipelines of the texels. In other words, in some cases the BISE decoded colour data is at least partially shared amongst the decoding pipelines of the texels being decoded in parallel from the data block. Similarly, the dequantized colour values are in some cases at least partially shared amongst the decoding pipelines of the texels being decoded. In other words, the BISE decoded and dequantized colour data may be common to at least some of the texels being decoded in parallel from the block 310. The BISE decoded colour data and dequantized colour values may also therefore be examples of common intermediate data.

More generally, when the number of colour values decoded from the data block (denoted $n_v$), is less than the number of partitions $n_p$ multiplied by the number of colour values $2n_{cv}$ in a colour endpoint pair (where $n_p$=the partition number and $n_{cv}$=the number of colour values to form a single colour endpoint), then a subset of the decoded and dequantized colour values may be converted to colour endpoints shared by a plurality of the texels being decoded (even if those texels belong to different partitions).

Figure 7:
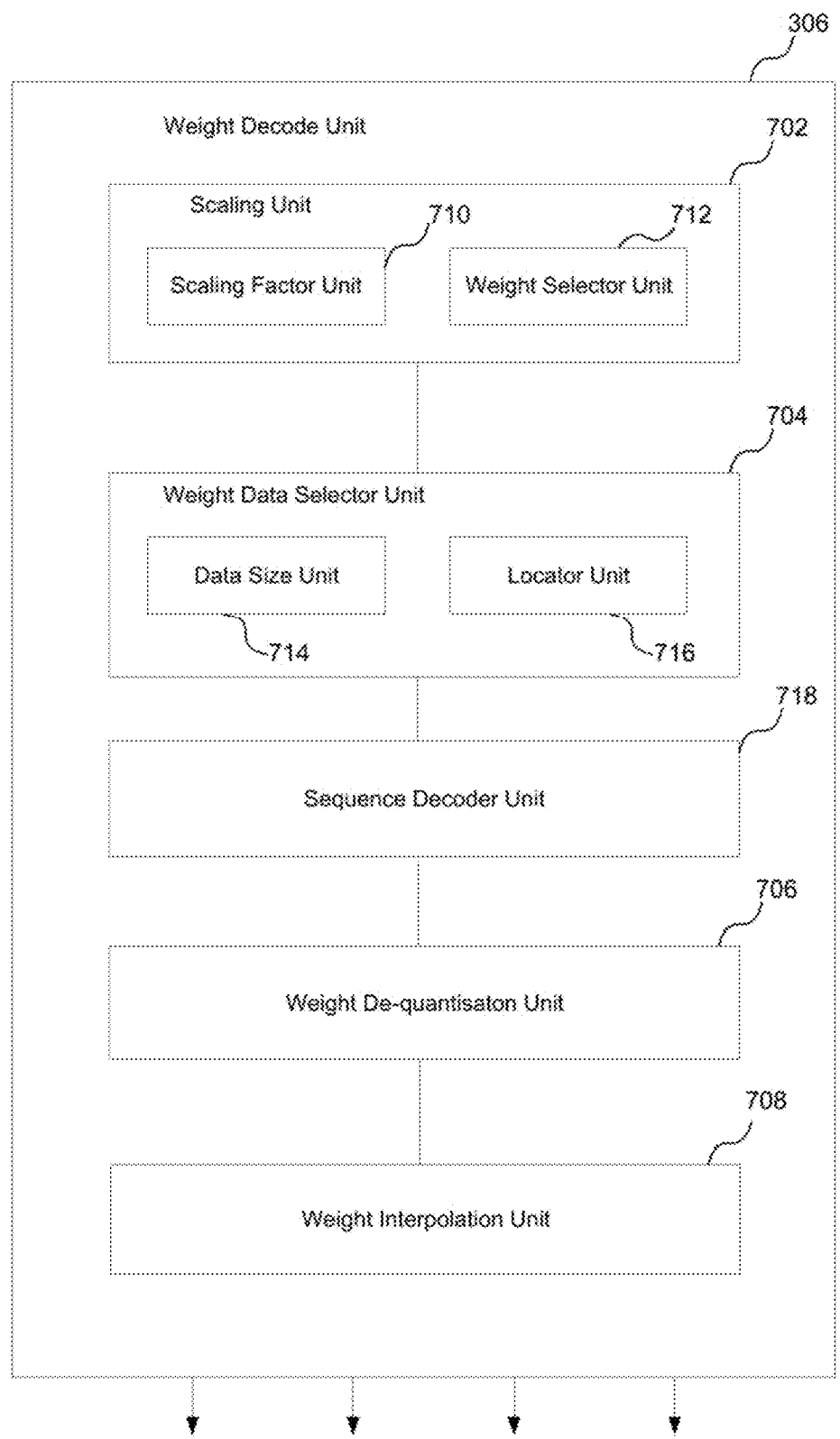
FIG. 7 shows an example structure of a weight decode unit forming part of the decoder shown in FIG. 3.

FIG. 7 shows an example internal structure for the weight decode unit 306. Here, the weight decode unit comprises a scaling unit 702; a weight data selector unit (WDSU) 704; a sequence decoder unit 718, a weight de-quantisation unit 706 and a weight interpolation unit 708. The scaling unit 702 is coupled to the WDSU 704; the WDSU is coupled to the de-quantising unit 706 and the de-quantising unit is coupled to the weight interpolation unit 708.

The scaling unit 702 is configured to identify weights of the weight grid to be used in an interpolation so as to generate a weight for each of the texels 406$_{A-D}$. The scaling unit 702 may identify a set of weights from the weight grid for each texel being decoded. Each set of weights can then be interpolated to generate a final weight for each texel.

As described above, depending on the size of the block footprint a weight may not be explicitly stored for each texel represented by the data block. For larger block footprints (e.g. 12 by 12 texels), the weight grid is of a sparser resolution than the block dimensions. In such cases, in order to derive a weight for each texel, the texel's coordinates are scaled to the dimensions of the weight grid and then a weight interpolation is performed for each texel in order to calculate a weight for those texels.

The scaling unit 702 comprises a scaling factor unit 710 and a weight selector unit 712. The scaling factor unit 710 decodes the scaling factor that scales the size of the weight grid to the size of the block footprint from the data block 310. The weight selector unit 712 uses the scaling factor to scale the coordinates of each of the texels 406$_{A-D}$ being decoded to the weight grid and to select weights of the weight grid to be used in an interpolation for each of the texels 406$_{A-D}$ to calculate a weight for those texels. The same scale factor as calculated by scale factor unit 710 is used by the weight selector unit 712 to scale the coordinates of each of the texels 406$_{A-D}$. Thus the scaling factor can be used to calculate the weights for each of the texels 406$_{A-D}$.

Figure 8:
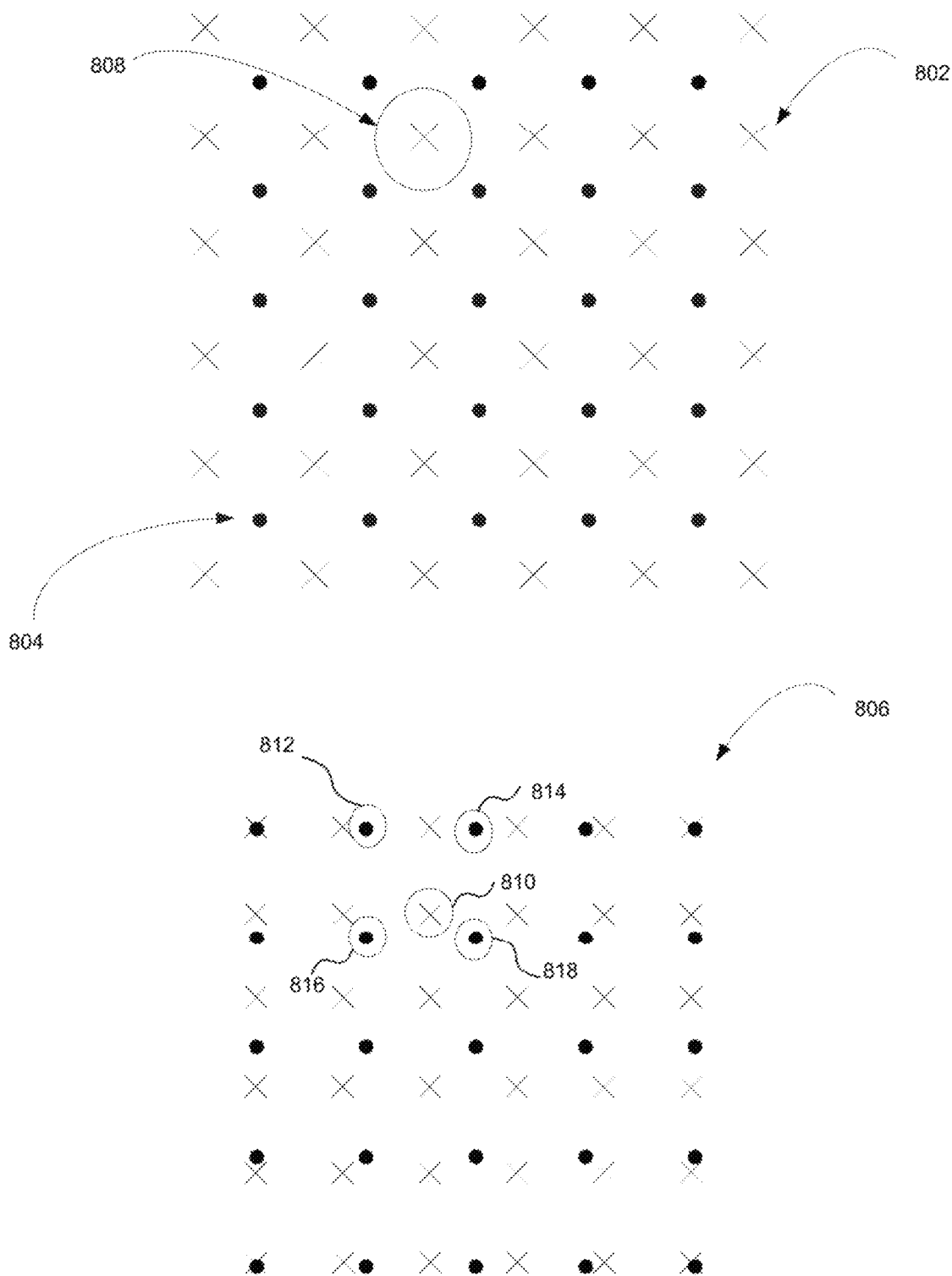
FIG. 8 shows an illustration of how coordinates of a texel within a block can be rescaled to the dimensions of a weight grid.

This process is illustrated schematically in FIG. 8. A 6 by 6 block footprint of texels is shown by the 'cross' markings (denoted generally at 802) and a 5 by 5 weight grid is shown by the 'dot' markings and denoted generally at 804. The weight grid is therefore of a lower resolution than the dimensions of the block footprint. The block footprint and the weight grid are shown overlapped with each other for the purposes of illustration. A scaling factor is then applied to the coordinates of the texels to re-scale the block footprint to the dimensions of the weight grid. The result of applying this scale factor is shown generally at 806. In this example the scaling factor has been applied to all the texels in the block footprint (rather than just the selected texels being decoded) for the purposes of illustration. The re-scaled texel coordinates are then used to select a set of weights of the weight grid to interpolate in order to calculate a weight for each texel. For example, the coordinates of texel A (circled for identification) are re-scaled from position 808 to position 810. The set of weights 812, 814, 816 and 818 are then selected for interpolation to generate a final weight for texel A using the re-scaled position of that texel with respect to the weight grid.

The weight data selector unit 704 determines the size of the weight data within the block and the location of the data for the selected weights of the weight grid to be used in the interpolation for each of the texels $406_{A-D}$ being decoded.

The WDSU comprises a weight data size unit 714 and a weight locator unit 716. The data size unit 714 is configured to determine the size of the weight data within the block 310. The data size unit 714 determines this based on the weight value ranges and the size of the weight grid as decoded by the block mode unit 502. The size of the weight data within the block 310 is used as part of the weight data decode for all the texels $406_{A-D}$ being decoded.

The weight locator unit 716 is configured to locate the weight data within the block 310 for each set of weights to be used in the weight interpolation for each of the texels $406_{A-D}$. That is, the weight locator unit 716 may separately locate the weight data within the block to be used in the weight interpolation for each texel being decoded. It may locate this weight data for each texel in parallel.

Like the colour data, the weight data may also be BISE encoded. The sequence decoder unit 718 is configured to perform binary integer sequence decoding of the weight data.

The weight de-quantization unit 706 is configured to de-quantise the decoded set of weights for each of the texels $406_{A-D}$ (that is, return each of the weights to their original range from their encoded range). The set of weights for each of the texels being decoded are independent of each other, and thus the de-quantization unit may comprise hardware to de-quantise the weight sets for each of the texels being decoded in parallel. However, in some cases the weights can be shared between texels being decoded. That is, a subset of the texels being decoded may share at least one weight. For example, for a 12×12 footprint and a 2×2 weight grid, the weights are shared for all the texels being decoded.

The weight interpolation unit 708 is configured to interpolate the set of weights for each texel being decoded to calculate for each of those texels final interpolation weight data (e.g. a final interpolation weight per plane for each texel being decoded). The weight interpolation unit may calculate the final interpolation weight data for each texel being decoded from the block 310 in parallel.

The interpolation weight data for each of the texels $406_{A-D}$ being decoded is then output from the weight decode unit 306.

Like the parameter decode unit 302 and the colour decode unit 304, the weight decode unit 306 decodes data from the block 310 that is independent of the texels being decoded. Thus the weight decode unit decodes per-block data (i.e. data specified on a per-block basis) as part of decoding the interpolation weight data. This data may be referred to as intermediate weight data, since it is data decoded from the data block 310 and used to decode the final interpolation weight data output by the weight decode unit. The weight decode unit uses the same per-block (intermediate) data to decode the interpolation weight data for all of the texels $406_{A-D}$. That is, the per-block data decoded by the weight decode unit is re-used in the decoding pipeline of each of the texels $406_{A-D}$. This advantageously enables the components that decode this data to be shared amongst the decoding pipelines for each of the texels being decoded from the block.

For instance, the scaling factor that scales the dimensions of the block footprint to the weight grid as decoded by the scale factor unit 710 is a parameter specified per data block and is independent of the texels being decoded. Thus the same scale factor can be used by the weight selector unit 712 to scale the coordinates of each of the texels $406_{A-D}$. Thus the scale factor unit may have substantially the same hardware requirements as if the decoder 300 were a single-output decoder.

Similarly, the size of the weight data within the block 310 is also a parameter that is independent of the texels being decoded. Thus the size of the weight data as decoded by the weight data size unit 714 is used by the weight locator unit 716 to locate the weight data for all of the texels $406_{A-D}$ being decoded. Thus the data size unit 714 may also have substantially the same hardware requirements as if the decoder 300 were a single-output decoder. Additional savings in hardware may be made if the requested texels are always (or often) adjacent, which means that for example for a 2×2 block, you would need a maximum of (p+1)(q+1) weights, instead of 4pq in general.

Referring back to FIG. 3, the at least one interpolator unit 308 is configured to calculate a colour value for each of the texels $406_{A-D}$ being decoded using the interpolation weight data for that texel and a pair of colour endpoints from the colour endpoint data. The interpolator unit(s) may calculate a final colour for each texel being decoded from the interpolant weight data for that texel output from the weight decode unit 306 and the colour endpoint pair for that texel output from the colour decode unit 304. The final colour values may be specified with respect to an RGBa colour space (i.e. each decoded colour may be in RGBa format).

The interpolator unit(s) 308 may calculate the colour for each texel by using the interpolant weight for that texel to interpolate between the associated colour endpoint pair.

The interpolator unit(s) 308 may be configured to calculate the final texel colours for each of the texels being decoded in parallel. The number of interpolator units 308 may be equal to the partition number of the texture data being decoded. Alternatively, the number of interpolator units may be equal to the number of texels being decoded from the data block 310.

Figure 9:
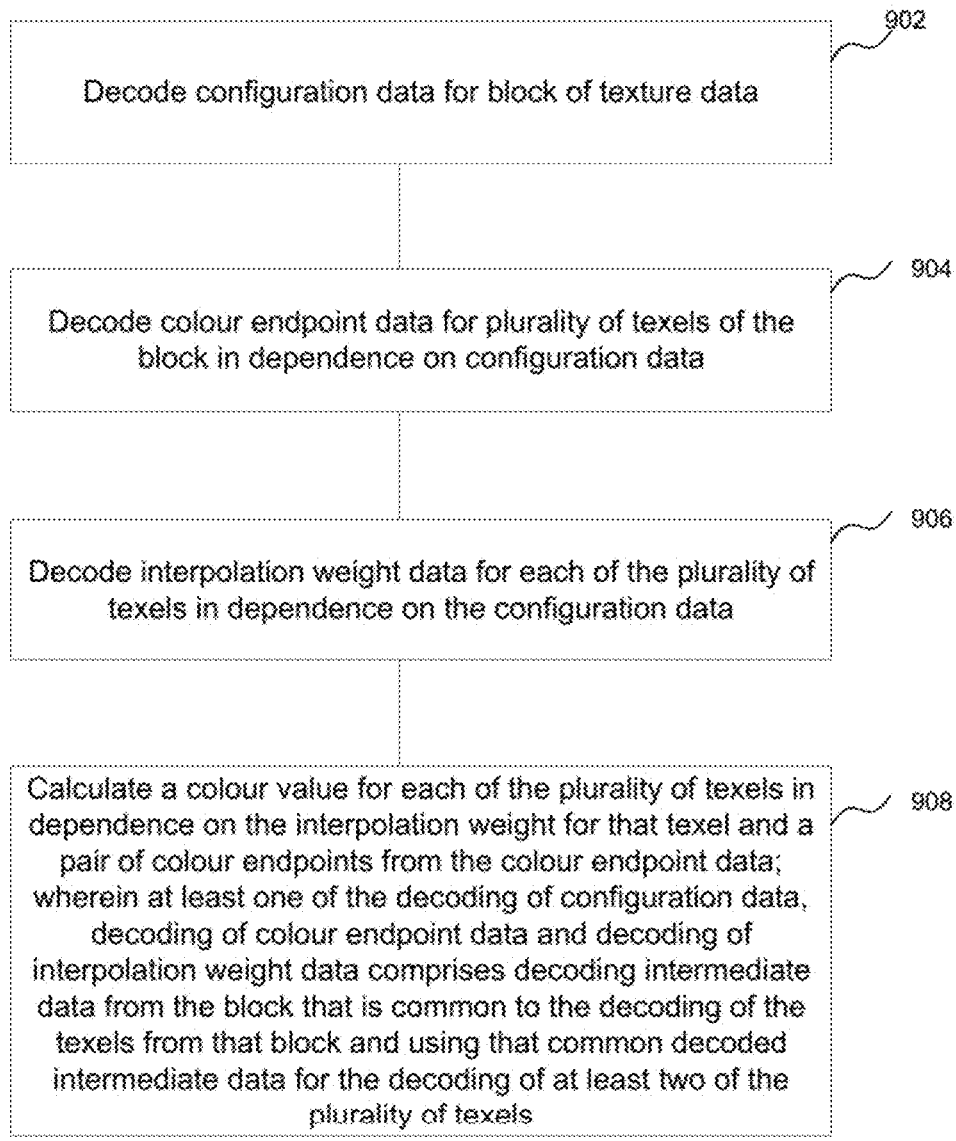
FIG. 9 shows a flowchart of steps for decoding a plurality of texels from a block of ASTC-encoded texture data.

FIG. 9 shows a flowchart of steps for decoding a plurality of texels from a block of texture data encoded according to an ASTC format.

At step 902, configuration data for the block of texture data is decoded.

At step 904, colour data for the plurality of texels of the block is decoded in dependence on configuration data.

At step 906, interpolation weight data for each of the plurality of texels is decoded in dependence on the configuration data.

At step 908, a colour value for each of the plurality of texels is calculated in dependence on the interpolation weight data for that texel and a pair of colour endpoints from the colour endpoint data; wherein at least one of the decoding of configuration data, decoding of colour endpoint data and decoding of interpolation weight data comprises decoding data from the block that is independent of the texels being decoded from that block and using that same data for the decoding of at least two of the plurality of texels.

The decoder 300 described above is a multi-output decoder that can decode multiple texels from a block of texture data compressed according to the ASTC specification. As in the examples above, the decoder can operate to decode the plurality of texels in parallel. However, advantageously, the decoder 300 can use certain portions of the data decoded from the texture data block as part of the decoding process for all of the texels being decoded from that block. Thus multiple texels can be decoded from the block in parallel without requiring parallel processing for each stage of the decoding process. This means the decoder 300 can have reduced hardware requirements (e.g. have a reduced area if implemented on an integrated circuit) compared to operating multiple conventional ASTC single-decoders in parallel. In particular, the inventors have found that by implementing the multiple output decoder in the manner described above to decode a 2 by 2 block of texels, the chip area can be reduced to approximately 2.4 times the chip area of a conventional single-output ASTC decoder, approximately equivalent to two thirds of the area of four single decoders. In other words, the multi-output decoder described herein can save approximately a third of the chip area compared to four single-output decoders operating in parallel.

Multiple components of the data decoded from the data block have been identified herein as being common to the decoding of at least some of the set of texels being decoded in parallel from the received data block. Some data decoded from the data block is independent of the set of texels being decoded from the received data block in parallel (and independent of the number of texels being decoded from the data block in parallel), and thus suitable for use in decoding all of the texels in that set. In the examples described above, the decoder was arranged so that each of these data components was used in the decoding process for all of the texels to be decoded from the block. Whilst this approach is likely to minimise the hardware requirements of the multi-decoder, it will be appreciated that the multi-decoder will realise gains in hardware efficiency so long as at least one portion, or component, of data decoded from the block that is common to the decoding of at least a subset of the set of texels being decoded in parallel from the received data block is used in the decoding process for those subset of texels. This is sufficient to avoid every stage of the decoding process from being executed multiple times in parallel for each texel being decoded. That component could be decoded by the parameter decode unit, weight decode unit, or colour decode unit.

In the examples above, the colour mode data was decoded by the parameter decode unit. However, it may alternatively be decoded by the colour decode unit.

In the examples above, the decoder 300 operated to decode a two by two block of texels from the data block in parallel. It will be appreciated that this was merely for the purposes of illustration and that the decoder 300 could be configured to decode any plurality of texels from the data block. For example, the decoder could decode a p by q sub-block of texels from the data block, where the dimensions of the sub-block in each direction are less than or equal to the corresponding dimension of the block footprint. Alternatively, the decoder 300 could decode a plurality of disparate texels from the block of data; that is, a plurality of texels where at least two of those texels are not contiguous. The decoder could operate to decode any $n_t$ texels from the received data block; i.e. the $n_t$ texels to be decoded from the block may be selected free of constraint.

The decoder 300 could be configured to decode multiple texels from a block of data representing dual-plane texture data, or single-plane texture data. The decoder can decode texture data from the block that has been encoded using either high dynamic range (HDR) or low dynamic range (LDR) (corresponding to the HDR profile and LDR profile respectively). Generally, the LDR profile supports two-dimensional textures, but it is also possible to support three-dimensional textures. The HDR profile also supports two-dimensional textures and additionally supports three-dimensional textures composed of multiple two-dimensional slices of compressed data.

The colour values may be formed from colour channels (e.g. luminance, R, G, B, alpha etc.), but in general may represent many different types of graphics data, e.g. height maps, normal maps, lighting etc.

The above examples describe how the decoder is operable to decode a maximum of $n_t$ texels from a single block 310. Though the decoders described herein are capable of decoding multiple texels in parallel from a single received data block, it will be appreciated that in some instances, the decoder may only decode a single texel from the received data block. The number of texels that the decoder actually decodes from a block may depend on the texel request received by the decoder. If the decoder, in response to receiving texture block 310 and a texel request, determines that only a single texel is to be decoded from the block 310, then it may turn down (e.g., power down, or turn off) a portion of its hardware to reduce power consumption. The size of the portion being turned down may be determined so that the remaining portion of the hardware (i.e. the portion that has not been turned down) can decode the texel without incurring a performance penalty (e.g. in the time taken to decode the requested texel).

The decoder 300 of FIGS. 1-7 is shown as comprising a number of functional blocks. This is schematic only and is not intended to define a strict division between different logic elements of such entities. Each functional block may be provided in any suitable manner. It is to be understood that intermediate values described herein as being formed by a particular block, or unit need not be physically generated by the block/unit at any point and may merely represent logical values which conveniently describe the processing performed by the block/unit between its input and output.

The decoders described herein may be embodied in hardware on an integrated circuit. The decoders described herein may be configured to perform any of the methods described herein. Generally, any of the functions, methods, techniques or components described above can be implemented in software, firmware, hardware (e.g., fixed logic circuitry), or any combination thereof. The terms "module," "functionality," "component", "element", "unit", "block" and "logic" may be used herein to generally represent software, firmware, hardware, or any combination thereof. In the case of a software implementation, the module, functionality, component, element, unit, block or logic represents program code that performs the specified tasks when executed on a processor. The algorithms and methods described herein could be performed by one or more processors executing code that causes the processor(s) to perform the algorithms/methods. Examples of a computer-readable storage medium include a random-access memory (RAM), read-only memory (ROM), an optical disc, flash memory, hard disk memory, and other memory devices that may use magnetic, optical, and other techniques to store instructions or other data and that can be accessed by a machine.

The terms computer program code and computer readable instructions as used herein refer to any kind of executable code for processors, including code expressed in a machine language, an interpreted language or a scripting language. Executable code includes binary code, machine code, bytecode, code defining an integrated circuit (such as a hardware description language or netlist), and code expressed in a programming language code such as C, Java or OpenCL. Executable code may be, for example, any kind of software, firmware, script, module or library which, when suitably executed, processed, interpreted, compiled, executed at a virtual machine or other software environment, cause a processor of the computer system at which the executable code is supported to perform the tasks specified by the code.

A processor, computer, or computer system may be any kind of device, machine or dedicated circuit, or collection or portion thereof, with processing capability such that it can execute instructions. A processor may be any kind of general purpose or dedicated processor, such as a CPU, GPU, System-on-chip, state machine, media processor, an application-specific integrated circuit (ASIC), a programmable logic array, a field-programmable gate array (FPGA), or the like. A computer or computer system may comprise one or more processors.

It is also intended to encompass software which defines a configuration of hardware as described herein, such as HDL (hardware description language) software, as is used for designing integrated circuits, or for configuring programmable chips, to carry out desired functions. That is, there may be provided a computer readable storage medium having encoded thereon computer readable program code in the form of an integrated circuit definition dataset that when processed (i.e. run) in an integrated circuit manufacturing system configures the system to manufacture a decoder configured to perform any of the methods described herein, or to manufacture a decoder comprising any apparatus described herein. An integrated circuit definition dataset may be, for example, an integrated circuit description.

Therefore, there may be provided a method of manufacturing, at an integrated circuit manufacturing system, a decoder as described herein. Furthermore, there may be provided an integrated circuit definition dataset that, when processed in an integrated circuit manufacturing system, causes the method of manufacturing a decoder to be performed.

An integrated circuit definition dataset may be in the form of computer code, for example as a netlist, code for configuring a programmable chip, as a hardware description language defining an integrated circuit at any level, including as register transfer level (RTL) code, as high-level circuit representations such as Verilog or VHDL, and as low-level circuit representations such as OASIS (RTM) and GDSII. Higher level representations which logically define an integrated circuit (such as RTL) may be processed at a computer system configured for generating a manufacturing definition of an integrated circuit in the context of a software environment comprising definitions of circuit elements and rules for combining those elements in order to generate the manufacturing definition of an integrated circuit so defined by the representation. As is typically the case with software executing at a computer system so as to define a machine, one or more intermediate user steps (e.g. providing commands, variables etc.) may be required in order for a computer system configured for generating a manufacturing definition of an integrated circuit to execute code defining an integrated circuit so as to generate the manufacturing definition of that integrated circuit.

An example of processing an integrated circuit definition dataset at an integrated circuit manufacturing system so as to configure the system to manufacture a decoder will now be described with respect to FIG. 9.

Figure 10:
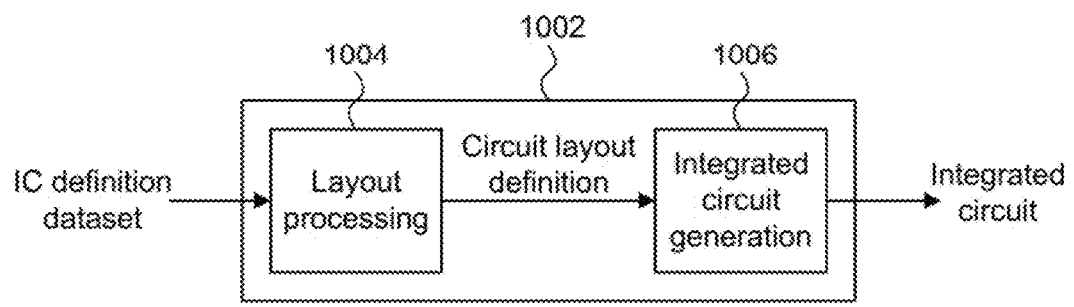
FIG. 10 shows an example of an integrated circuit manufacturing system.

FIG. 10 shows an example of an integrated circuit (IC) manufacturing system 1002 which is configured to manufacture a decoder as described in any of the examples herein. In particular, the IC manufacturing system 1002 comprises a layout processing system 1004 and an integrated circuit generation system 1006. The IC manufacturing system 1002 is configured to receive an IC definition dataset (e.g. defining a decoder as described in any of the examples herein), process the IC definition dataset, and generate an IC according to the IC definition dataset (e.g. which embodies a decoder as described in any of the examples herein). The processing of the IC definition dataset configures the IC manufacturing system 1002 to manufacture an integrated circuit embodying a decoder as described in any of the examples herein.

The layout processing system 1004 is configured to receive and process the IC definition dataset to determine a circuit layout. Methods of determining a circuit layout from an IC definition dataset are known in the art, and for example may involve synthesising RTL code to determine a gate level representation of a circuit to be generated, e.g. in terms of logical components (e.g. NAND, NOR, AND, OR, MUX and FLIP-FLOP components). A circuit layout can be determined from the gate level representation of the circuit by determining positional information for the logical components. This may be done automatically or with user involvement in order to optimise the circuit layout. When the layout processing system 1004 has determined the circuit layout it may output a circuit layout definition to the IC generation system 1006. A circuit layout definition may be, for example, a circuit layout description.

The IC generation system 1006 generates an IC according to the circuit layout definition, as is known in the art. For example, the IC generation system 1006 may implement a semiconductor device fabrication process to generate the IC, which may involve a multiple-step sequence of photo lithographic and chemical processing steps during which electronic circuits are gradually created on a wafer made of semiconducting material. The circuit layout definition may be in the form of a mask which can be used in a lithographic process for generating an IC according to the circuit definition. Alternatively, the circuit layout definition provided to the IC generation system 1006 may be in the form of computer-readable code which the IC generation system 1006 can use to form a suitable mask for use in generating an IC.

The different processes performed by the IC manufacturing system 1002 may be implemented all in one location, e.g. by one party. Alternatively, the IC manufacturing system 1002 may be a distributed system such that some of the processes may be performed at different locations, and may be performed by different parties. For example, some of the stages of: (i) synthesising RTL code representing the IC definition dataset to form a gate level representation of a circuit to be generated, (ii) generating a circuit layout based on the gate level representation, (iii) forming a mask in accordance with the circuit layout, and (iv) fabricating an integrated circuit using the mask, may be performed in different locations and/or by different parties.

In other examples, processing of the integrated circuit definition dataset at an integrated circuit manufacturing system may configure the system to manufacture a decoder without the IC definition dataset being processed so as to determine a circuit layout. For instance, an integrated circuit definition dataset may define the configuration of a reconfigurable processor, such as an FPGA, and the processing of that dataset may configure an IC manufacturing system to generate a reconfigurable processor having that defined configuration (e.g. by loading configuration data to the FPGA).

In some embodiments, an integrated circuit manufacturing definition dataset, when processed in an integrated circuit manufacturing system, may cause an integrated circuit manufacturing system to generate a device as described herein. For example, the configuration of an integrated circuit manufacturing system in the manner described above with respect to FIG. 10 by an integrated circuit manufacturing definition dataset may cause a device as described herein to be manufactured.

In some examples, an integrated circuit definition dataset could include software which runs on hardware defined at the dataset or in combination with hardware defined at the dataset. In the example shown in FIG. 10, the IC generation system may further be configured by an integrated circuit definition dataset to, on manufacturing an integrated circuit, load firmware onto that integrated circuit in accordance with program code defined at the integrated circuit definition dataset or otherwise provide program code with the integrated circuit for use with the integrated circuit.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein. In view of the foregoing description it will be evident to a person skilled in the art that various modifications may be made within the scope of the invention.

What is claimed is:

1. A decoder configured to decode a plurality of texels of a p by q sub-block of texels from a block of texture data encoded according to the Adaptive Scalable Texture Compression (ASTC) format, the decoder being configured to:
    identify a maximum of $(p+1)(q+1)$ weights of a weight grid;
    interpolate sets of weights of the identified maximum of $(p+1)(q+1)$ weights so as to generate a respective final weight for each of the plurality of texels; and
    decode each of the plurality of texels in dependence on the respective final weight for each of the plurality of texels.

2. The decoder of claim 1, the decoder being configured to:
    scale the coordinates of each of the plurality of texels to the dimensions of the weight grid.

3. The decoder of claim 2, the decoder being configured to:
    use the re-scaled coordinates of each of the plurality of texels to select a respective set of weights for each of the plurality of texels.

4. The decoder of claim 3, wherein a weight of the identified maximum of $(p+1)(q+1)$ weights can be comprised by the respective set of weights for more than one of the plurality of texels.

5. The decoder of claim 3, the decoder being configured to:
    interpolate the respective set of weights for each of the plurality of texels in order to calculate a respective final weight for each of the plurality of texels.

6. The decoder of claim 5, wherein said interpolations are dependent on the respective re-scaled coordinates of each of the plurality of texels.

7. The decoder of claim 2, the decoder being configured to:
    use the re-scaled coordinates of at least one of the plurality of texels to identify the maximum of $(p+1)(q+1)$ weights of the weight grid.

8. The decoder of claim 1, wherein each set of weights of the identified maximum of $(p+1)(q+1)$ weights comprises four weights.

9. The decoder of claim 1, wherein the block of texture data represents an n by m block of texels, where $p \leq n$ and $q \leq m$.

10. The decoder of claim 9, wherein the number of weights comprised by the weight grid is less than the number of texels comprised by the n by m block of texels.

11. The decoder of claim 9, wherein the p by q sub-block of texels comprises $n_t$ texels, where $2 \leq n_t \leq nm$.

12. The decoder of claim 1, where $p=q=2$.

13. The decoder of claim 1, wherein the plurality of texels of the p by q sub-block of texels are adjacent.

14. The decoder of claim 1, wherein the decoder is configured to decode the plurality of texels in parallel.

15. The decoder of claim 1, the decoder being configured to decode each of the identified maximum of $(p+1)(q+1)$ weights of the weight grid from the block of texture data.

16. The decoder of claim 1, wherein decoding each of the plurality of texels in dependence on the respective final weight for each of the plurality of texels comprises, for each the plurality of texels:
    determining a colour value for that texel by interpolating between a respective pair of colour endpoints using the final weight for that texel.

17. The decoder of claim 1, wherein the block of texture data is single-plane.

18. The decoder of claim 1, wherein the block of texture data is dual-plane, and the decoder is configured to:
    identify a maximum of $(p+1)(q+1)$ weights per-plane;
    interpolate sets of weights of the identified weights so as to generate a respective final weight per-plane for each of the plurality of texels; and
    decode each of the plurality of texels in dependence on the respective final weight per-plane for each of the plurality of texels.

19. A method of decoding a plurality of texels of a p by q sub-block of texels from a block of texture data encoded according to the Adaptive Scalable Texture Compression (ASTC) format, the method comprising:
    identifying a maximum of $(p+1)(q+1)$ weights of a weight grid;
    interpolating sets of weights of the identified maximum of $(p+1)(q+1)$ weights so as to generate a respective final weight for each of the plurality of texels; and
    decoding each of the plurality of texels in dependence on the respective final weight for each of the plurality of texels.

20. A non-transitory computer readable medium having stored thereon an integrated circuit definition dataset that, when processed in an integrated circuit manufacturing system, configures the integrated circuit manufacturing system to manufacture a decoder configured to decode a plurality of texels of a p by q sub-block of texels from a block of texture data encoded according to the Adaptive Scalable Texture Compression (ASTC) format, the decoder being configured to:
- identify a maximum of $(p+1)(q+1)$ weights of a weight grid;
- interpolate sets of weights of the identified maximum of $(p+1)(q+1)$ weights so as to generate a respective final weight for each of the plurality of texels; and
- decode each of the plurality of texels in dependence on the respective final weight for each of the plurality of texels.

* * * * *